Feb. 7, 1933.  W. J. BEATTIE  1,896,934
COLLAR POINT SHAPING MACHINE
Filed Aug. 11, 1930   4 Sheets-Sheet 1

Inventor
Walter J. Beattie.
By
Cushman Bryant & Darby
Attorneys

Feb. 7, 1933. W. J. BEATTIE 1,896,934
COLLAR POINT SHAPING MACHINE
Filed Aug. 11, 1930  4 Sheets-Sheet 2
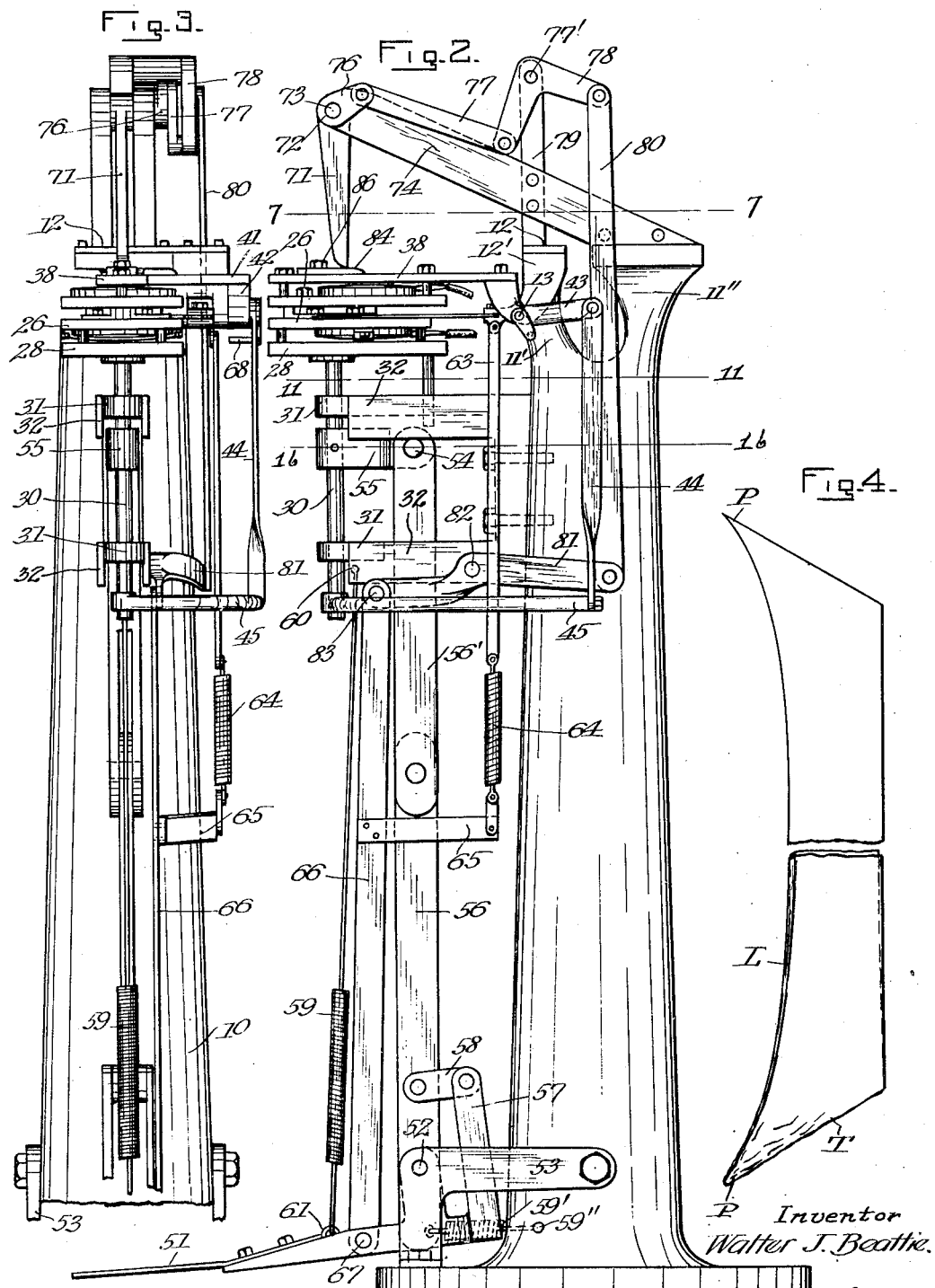

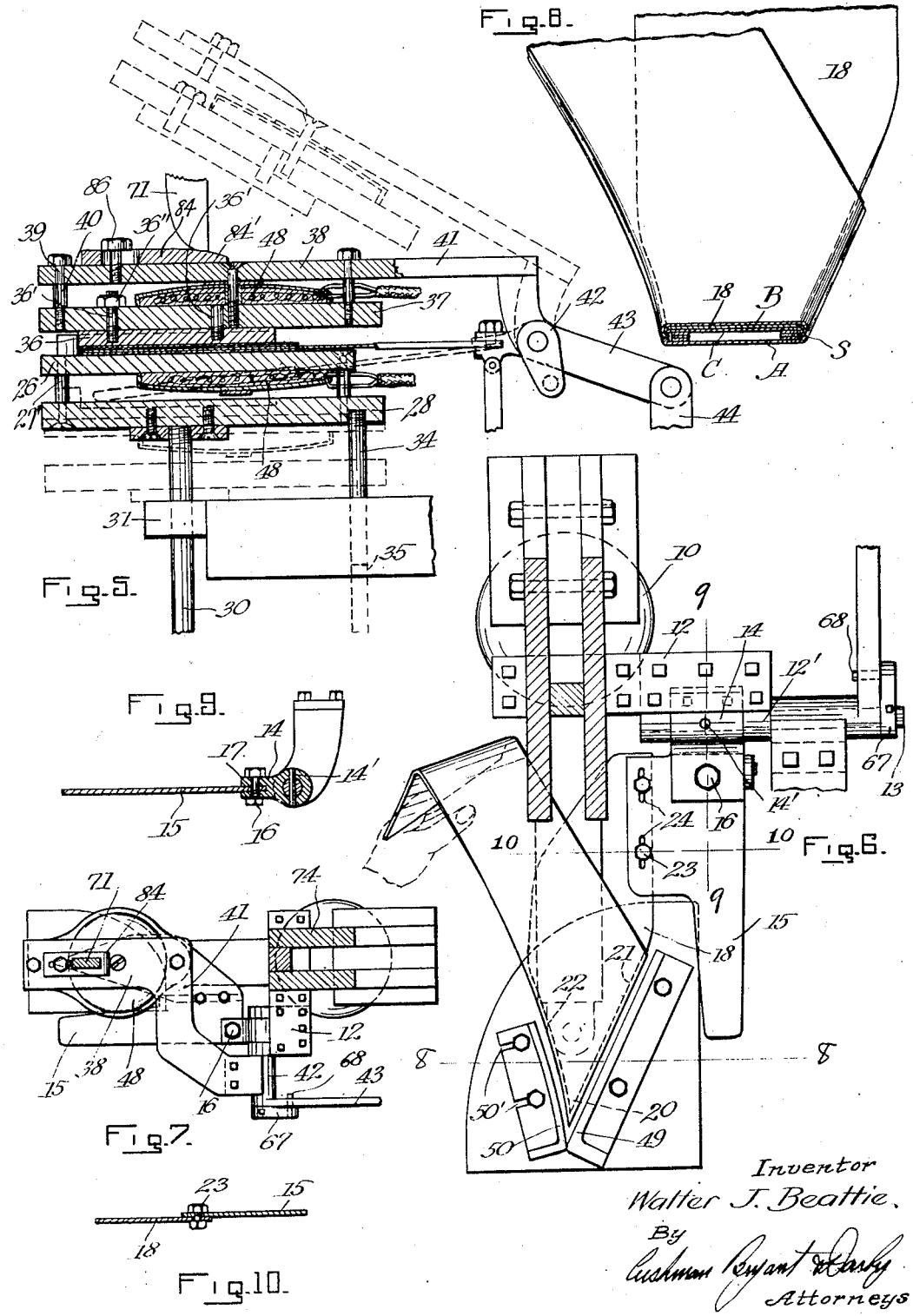

Feb. 7, 1933.   W. J. BEATTIE   1,896,934
COLLAR POINT SHAPING MACHINE
Filed Aug. 11, 1930   4 Sheets—Sheet 4

Inventor
Walter J. Beattie
By
Ashman Bryant & Darby
Attorneys

Patented Feb. 7, 1933

1,896,934

UNITED STATES PATENT OFFICE

WALTER J. BEATTIE, OF COHOES, NEW YORK, ASSIGNOR TO THE BEATTIE MANUFACTURING CO., OF COHOES, NEW YORK, A CORPORATION OF NEW YORK

COLLAR POINT SHAPING MACHINE

Application filed August 11, 1930. Serial No. 474,590.

The present invention relates to a machine for the manufacture of garment points, and more particularly collars having a multiple ply fold-over top.

An object of the invention is to provide a machine adapted for use in forming or shaping the points of the fold-over top in the course of the manufacture of garment points and particularly collar manufacture, and which is adapted for use in practicing the method disclosed in my Patent No. 1,795,704, granted March 10, 1931.

Another object of the invention is to provide a machine which will uniformly shape and impart a set to the garment and particularly collar points, thereby improving the appearance of the collar where it is most conspicuous when displayed or worn.

A further object of the invention is to provide a machine which will perform this function with a minimum of manual labor, and which is virtually automatic in its operation.

Other objects of the invention have to do with simplicity of construction, ease of operation, and adaptability to various shapes and sizes of points. Additional features and objects of the invention will become clearer as the description proceeds in connection with a preferred embodiment shown in the accompanying drawings.

Collars of the soft or semi-soft type having multiple ply fold-over tops may be conveniently divided into two distinct classes from the standpoint of the method employed in manufacture. The first class may be identified as the machine-turned collar, and the second class the hand-turned collar.

In the manufacture of the machine-turned collar the facing plies of the top are folded along their edges, and are disposed in registry with one another with the edges inturned and facing; an interliner is ordinarily disposed between the plies and the collar is then stitched by a single marginal line of stitching. Subsequent operations do not change this relation of the several plies.

In the manufacture of the hand-turned collar, the same three plies are superimposed in registry with one another, the two facing plies being arranged together, and the interliner initially forming a third and outer ply. The three plies are then stitched together by a marginal line of stitching which extends along one longitudinal edge and the two transverse edges. Where the longitudinal and transverse lines of stitching meet, the collar points are formed. The collar is then turned inside out, ordinarily by a manual operation, with the result that the interliner is disposed between the two facing plies and edges of all three plies are inturned, thereby concealing the stitching. Thereafter, a second marginal line of exposed stitching is run parallelling the concealed longitudinal and transverse lines of stitching, thus forming a completed top which is ready for attachment to the band.

The present invention relates primarily to this second class of collars which involves the hand-turning operation after the three plies are stitched together.

Although by far the greater portion of collars now manufactured are of the hand-turned type, a serious objection to this type of collar has been the lack of uniformity in the shape of the collar points formed where the longitudinal and transverse lines of stitching meet. Since these lines of stitching are spaced somewhat from the edges of the plies, the subsequent inturning operation provides a surplus of material at the points, thus rendering the same objectionably bulky. Moreover, since the arrangement of the surplus material at the points has been dependent upon the uniformity of material between the line of stitching and the edge, and the accuracy of the operator in turning the collar, this surplus material is not uniformly distributed at the points of different collars or even at the points of the same collar. Consequently, the subsequent pressing operation does not provide points which are exactly matched, due to the fact that the surplus material at the points is not uniformly distributed.

Since the points of the fold-over top are the most conspicuous portions of a collar, they are the portions of the collar to which those experienced in the trade primarily direct their attention in determining quality and salability of the article.

The present invention seeks to provide a machine which will enable the operator to distribute uniformly the material at the collar points and to produce points of predetermined and uniform shape. It also seeks to impart a set to the collar points which will cause the produced shape to be retained, even after laundering when the collar has been worn.

Having explained the particular stage of collar manufacture for which the machine of the present invention is intended, a preferred embodiment of the invention disclosed in the accompanying drawings will now be described.

In the drawings:

Figure 2 is a view in side elevation with the various parts in a pressing position.

Figure 3 is a view in front elevation of the machine as shown in Figure 2, the base being broken away.

Figure 4 is a plan view of a collar such as is pressed on this machine, showing one end with the seam turned over on the side and irregular, the corner not properly pointed, and thick and lumpy from the inturned edges of material, the opposite end is shown after pressing, with the corner perfectly flat and pointed.

Figure 5 is a view partly in central vertical section, and partly in side elevation, of the pressing members in pressing position and a collar being pressed therebetween.

Figure 6 is a top plan fragmentary view of the pressing bed of the machine, with a collar drawn onto the die, with the die shown depressed, onto the bed of the machine showing a space between the walls of the recess on the bed of the machine, and the edges of the collar.

Figure 7 is a horizontal section of line 7—7 in Figure 2.

Figure 8 is a vertical section on line 8—8 in Figure 6, through the collar point, drawn over the depressed forming die and showing the die between the lining and outer ply of material.

Figure 9 is a vertical section of line 9—9 in Figure 6.

Figure 10 is a vertical section on line 10—10 in Figure 6.

Figure 1:
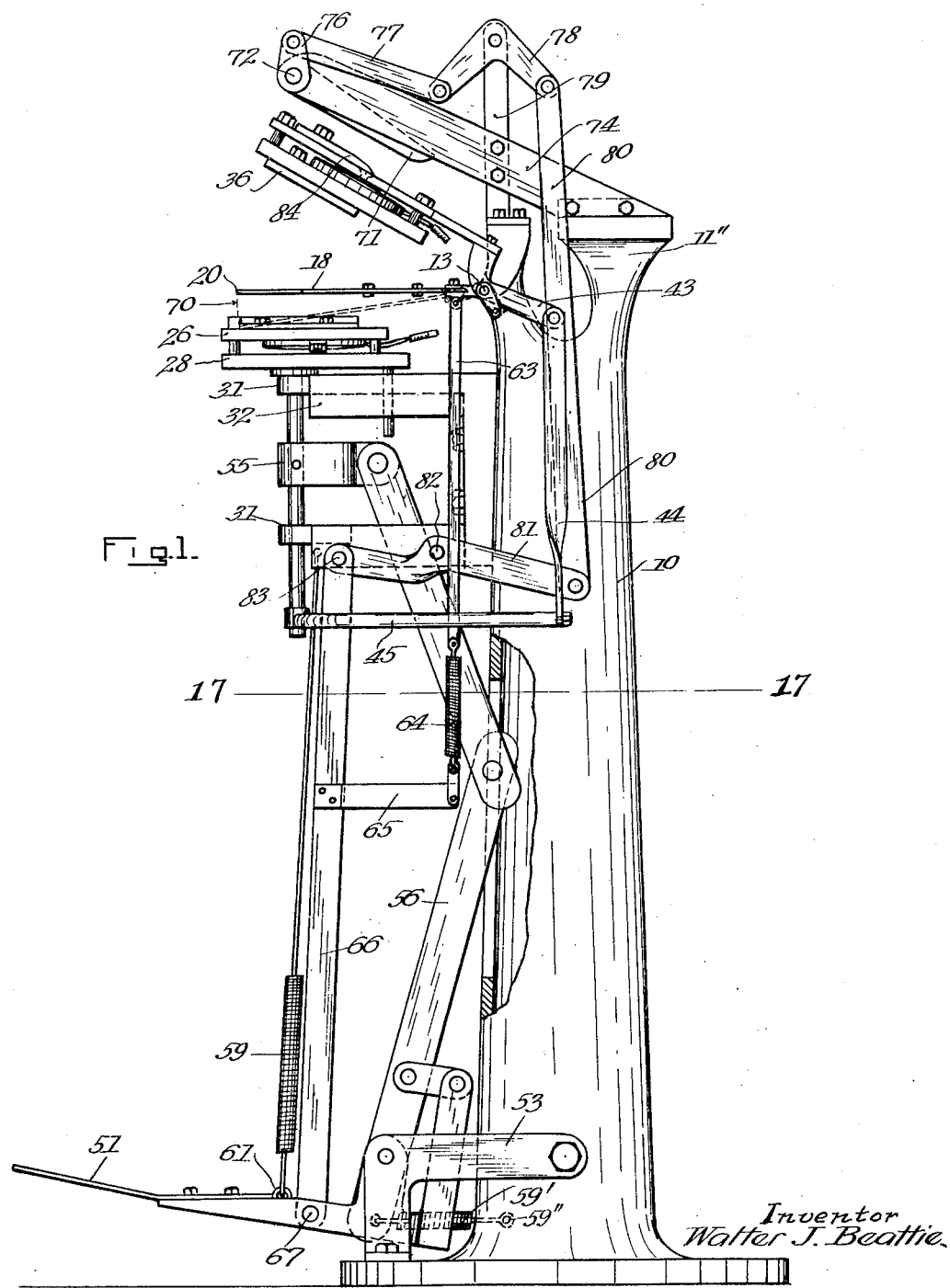
Figure 1 is a view in side elevation with the machine in starting position and ready to receive the end of a collar.
Figure 14:
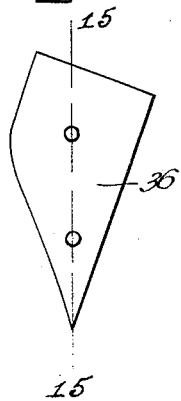
Figure 14 is a top plan view of the pressing pad detached.
Figure 15:
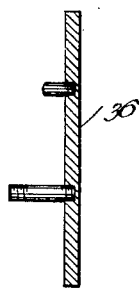
Figure 15 is a vertical section of the same taken on line 15—15 in Figure 14.
Figure 12:
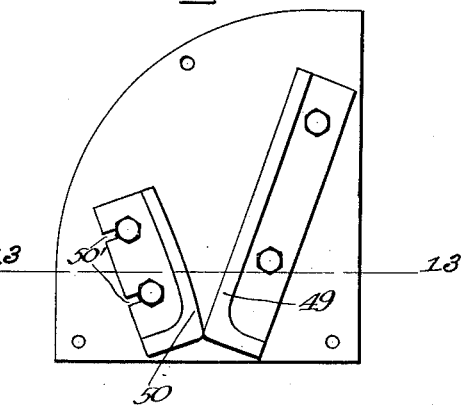
Figure 12 is a plan view of the pressing bed.
Figure 11:
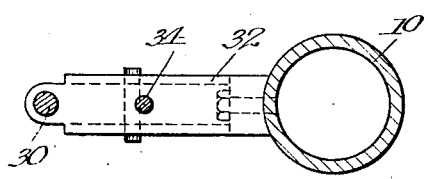
Figure 11 is a horizontal section on line 11—11 in Figure 2.

Referring to the drawings for a more detailed description, 10 indicates a standard or pedestal, the upper end of which is bifurcated to form a forwardly positioned arm 11′ and a rearwardly positioned arm 11″. The arm 11′ carries a plate 12 extending laterally and supporting a pair of bearings 12′ (Figure 6) for a rock shaft 13. A sleeve 14 is fixed upon the shaft between the bearings by a pin 14′ (Figure 9) and supports a forwardly projecting die carrying plate 15, secured to the sleeve by a bolt 16, which projects through the plate and a lug 17 on the sleeve slotted to receive the edge of the plate. The plate 15 carries a forwardly directed die 18, which is relatively thin and flexible, and has a narrowed pointed end 20 formed by edges 21, 22, which converge toward the point. The die is detachably secured to the plate 15, as by bolts 23, which project through elongated slots 24 in the plate and through the die. This mode of attachment permits the die to be adjusted forwardly and rearwardly for purposes later to be described, and also to be replaced by a die of different formation, if desired. The die is shaped at its point to conform to the point of the fold-over top of a collar, so that it may be inserted between the plies of the collar top.

Arranged beneath the die is a receiving means or bed comprising a top surface 26, spaced by means of studs having spacing sleeves 27′ from an undersurface 28, the latter being supported for vertical movement by a vertical rod or shaft 30 which slides in bearings 31 in two brackets 32 vertically spaced apart and secured to the standard 10. The rod and bed are vertically moved in a manner later to be described, and are guided in their vertical movement by means of a pin 34 secured to the undersurface 28 and having a slidable bearing 35 on the upper bracket 32.

Above the die is disposed a means to cooperate with the bed to apply pressure to collar point surfaces positioned on the bed; this means may be termed a head comprising a pressing means, which, in the present instance, takes the form of a pad 36 (Fig. 5) detachably secured by studs 36′ to the bottom web 37 of the head, which is spaced and supported from a top web 38 by means of screws 39 carrying spacing sleeves 40. The studs 36′ are threaded into the pad and freely project through the web 37, one of the pins receiving on top of web 37 a nut 36″, whereby to detachably support the pad while it is centered or held in position against lateral movement by the other pin. This head is pivotally mounted upon shaft 13 by a laterally extending arm 41 connected to the upper surface of the head and terminating in a depending sleeve 42 (Fig. 7), which surrounds and is freely movable on the shaft 13. The sleeve 42 has an integral rearwardly extending arm 43, which is connected by means of a depending link 44 to a curved horizontal arm 45 mounted upon and secured to the lower end of the rod 30. The bed is thereby connected to the head so that, upon upward movement of the bed and rod 30, there is caused upward movement of link 44 and arm 43, thus rocking the sleeve 42 and lowering the pressing head and its pad toward the bed. The die is thus pressed between the head and bed, and a collar positioned thereon, as illustrated in Figure 6, will be pressed. Both the bed and head are provided between their spaced upper and lower surfaces with electrical heating means 48, so that the collar point disposed upon the die may be heated while under pressure.

In addition to pressing the material of a collar point, the parts are arranged so that the point positioned upon the die is shaped and has any surplus material disposed at the point uniformly distributed. For this purpose, the parts are located so that as the bed and die are actuated, pressure is applied against the edges of the die and the edges of a collar positioned thereon.

As above explained, the die is pivotally mounted upon the shaft 13 by means of the die carrier 15, and means is provided for causing a relative movement between the edges of the die and an external shaping means. In the present form, this shaping means comprises an external die fixed to the bed, and having walls 49, 50 complemental to the edges 21, 22 of die 18. One of the walls has a base provided with slots 50', whereby it may be adjusted relatively to the other wall. Moreover, the pad 36 on the head is detachable, as explained, so that pads conforming to the shape of and adapted to enter the external die or recess may be positioned on the head. As will be understood, the pad is shaped so that it may enter between walls 49, 50, and effectively engage the collar point over its entire top surface between the walls 49, 50. As will be observed (Fig. 6), the walls 49 and 50 substantially parallel the edges 21, 22 of the internal die and extend upwardly from the top surface 26 of the bed transversely to the plane of the latter so as to form a recess for the reception of the latter upon the bed. As will be understood, the walls 49, 50 constitute surfaces which abut the edges of the collar or garment point and confine the same to a predetermined shape during the application of heat and pressure to the surfaces of the collar or garment point while the latter is confined in the recess between the walls.

The operation of the parts and relative movement between the internal and external dies, for the purpose of distributing the surplus material at the collar point and shaping the latter, will become clearer in the course of the description of the actuating devices for the various parts. The actuating devices include (a) means for lowering the die 18 into the recess or external die upon the bed, and (b) means for raising the bed and lowering the head, and applying pressure against the surfaces and edges of the collar while heating the latter.

Figure 17:
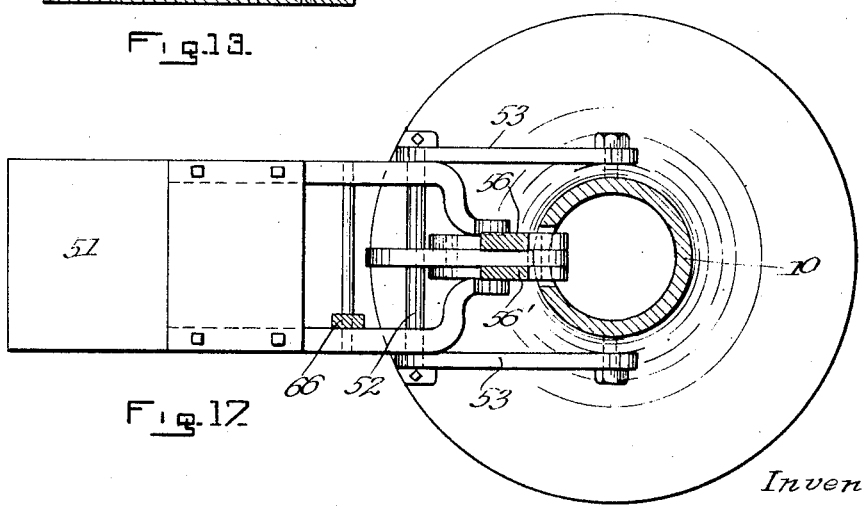
Figure 17 is a horizontal section taken on line 17—17 in Figure 1.

A pedal 51 (Fig. 17) is pivoted on a shaft 52 carried by brackets 53, fastened to the base of the standard. On shaft 52 is also pivoted one end of a toggle, comprising links 56, 56', the other end of the toggle being pivoted at 54 to a lug 55, pinned to the rod 30. The pedal 51 is connected by an upstanding terminal portion or arm 57 and link 58 with the link 56 of the toggle, so that depression of the pedal serves to straighten the toggle from the position shown in Figure 1, to which it is normally carried by the treadle lift spring 59, connected at one end 60 to the bracket 31, and at its other end to an eye 61 on the treadle.

Depression of the treadle and straightening of the toggle serves to lift the bed from its lowered position (Fig. 1) to its raised position (Fig. 2). The initial movement of the treadle tends to move the garment point by actuating the flexible die, thereby carrying the point to a position within the external die; in other words, the initial movement will serve to lower the flexible die 18 to the bed, thereby moving the point of the die, on which a collar has been positioned, between the walls 59, 50 which form a recess or external die on the bed. In order to impart this preliminary lowering movement to the die 18, the latter has an extensible connection, comprising a link 63 and coil spring 64, with an arm 65 carried by a link 66 pivotally connected at its lower end 67 to the treadle. Depression of the treadle exerts a corresponding downward pull upon the extensible connection 63, 64, thereby lowering the die 18 from its horizontal position (Fig. 1) to an inclined or depressed position, illustrated in dotted lines in Fig. 1 and in full lines in Fig. 6.

As above explained, in its vertical movement the flexible die 18 causes a rocking movement of shaft 13 and the shaft has fixed thereon a collar 67 (Fig. 6) formed with a laterally projecting lug 68 extending beneath the arm 43 connected with the head; this lug 68 serves to limit the downward movement of the die under the influence of the extensible connection which prevents excessive flexing of the die. As the die engages the bed within the recess formed by the walls 49, 50 of the external die, its edges 21, 22, are spaced slightly from the walls 49, 50 of the external die. The die may be adjusted on the carrier 15 to maintain the desired relation between its edges 21, 22 and the walls of the external die. That is to say, should it be found that when the die is lowered the edges are not spaced sufficiently from the external die walls an adjustment may be made to obtain the desired spaced relation.

Following this engagement, the continued lowering of the pedal straightens the toggle and causes the bed to rise and move the die to the horizontal position illustrated in Figure 5. This upward movement of the die is permitted by the extensible connection 63, 64 of the same with link 66. In its upward movement, the tip of the die 18 travels in a vertical arc having as its radius the axis of shaft 13, the arc being indicated by the dotted line 70 (Figure 1). Since the bed is moving in a vertical rectilinear path to which it is limited by the rod 30 and stud 34, the edges 21, 22 of the interior die tend to approach the walls 49, 50 of the external die, thereby pressing between the edges of the interior die and the external die walls the interposed edges of the collar adjacent the collar point. This pressure serves to shape the point, and since the two points of the collar are successively placed upon the die, the same will be shaped uniformly. Moreover, the frictional engagement of the collar undersurface with the bed will assist the operator in distributing the surplus material at the collar point.

During the upward movement of the bed the presser head with its pad 36 is being lowered, because of the connection between the bed and the head; this connection includes the arm 45 and link 44. The head is held in its horizontal position against upward pressure of the bed by an arm 71, pivoted at 72 on a pin 73; the pin is carried by a pair of upwardly and forwardly extending brackets 74, the brackets being positioned upon the arm 11″ at the upper end of the standard 10. The pin 73 has fixed thereto a crank 76 connected by means of a link 77 with bell crank lever 78 pivoted upon the post 79 at 77′. The bell crank lever 78 has its other end connected by means of a pitman 80 with a lever 81 pivoted at 82 upon the lower bracket 32 and the lever 81 is pivotally connected at 83 with the link 66.

Figure 16:
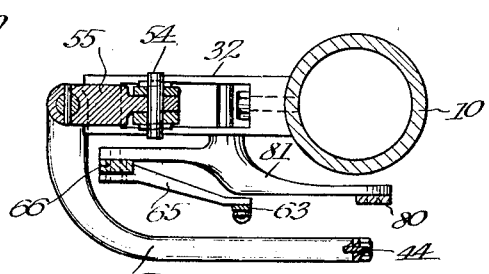
Figure 16 is a horizontal section on line 16—16 taken in Figure 2.
Figure 13:
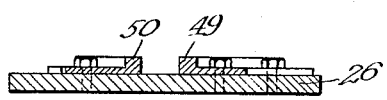
Figure 13 is a vertical section of the bed on line 13—13 in Figure 12.

As will be understood, depression of the treadle through the links above described causes the arm 71 to be lowered from its position shown in Figure 1 to the position shown in Figure 2, whereby its free end bears against a block 84 upon the top surface of the presser head, thereby holding the latter against upward movement under the upward pressure of the bed. The block 84 (Figure 5) is beveled at one end 84′ and is adjustably held in position by means of a screw 86, so that the same may be adjusted to vary the point at which the head meets the bed and prevents further upward movement of the latter. The block should be adjusted so that just before the maximum elongation of the toggle or end of the upward travel of the bed is reached, the arm 71 rests in a vertical position on top of block 84. The upward movement of the bed may be limited by means of the pin 54, which connects the upper end of the toggle with the lug 55, this pin being extended laterally a sufficient distance to engage the undersurface of the upper bracket 32 (Fig. 16).

It will be clear, therefore, that as the bed and flexible die are raised to a horizontal position (Fig. 2), the edges of the collar are pressed between opposed portions of the interior and exterior dies, due to the advance of the edges 21, 22 of the interior die toward the walls of the external die. After this movement has shaped the point of the collar, the surfaces of the latter are subjected to heat and pressure which may be continued as long as is found desirable. As will be understood, the heat and pressure are applied within the area defined by the external die walls 49, 50. These walls confine the edges of the collar point and are disposed so that the edges are confined to an area of predetermined shape or outline by reason of the fact that the walls of the die closely follow the edges of the collar point and the edges of the internal die. In other words, the walls of the external die are in substantially abutting relation to the collar edges and also substantially abut the edges of the internal die, with the result that they confine and hold the edges of the point to a predetermined shape while heat and pressure are applied. The retention of the internal die within the collar during the application of the heat and pressure provides an additional confining medium, although it will be understood that, before the pressure is applied, the material within the collar has been distributed by the internal die and the point has been externally shaped.

When pressure is released from the treadle 51, the spring 59, together with the weight of the bed, will cause the treadle to rise and release pressure upon the toggle, which permits the bed to drop. At the same time arm 45, attached to the bed guiding rod 30, causes the downward movement of the bed to raise the head due to the link 44 connecting the arm 45 with the head. The upward movement of the head is permitted by the previous raising of arm 71 through the linkage connecting the same with the treadle; hence upward movement of the treadle raises the arm. A buffer spring 59′ anchored to the standard at 59″ and secured to the lower end of link 56, below the shaft 52, serves to prevent undue shock and strain upon the various parts of the machine when the bed drops and the toggle returns from the pressing position shown in Fig. 2 to the starting position shown in Fig. 1. This spring also acts as a rebound brake against the action of spring 59 as it raises the pedal to starting position.

In the operation of the machine the pressure is applied to the opposed surfaces of the collar, while heat is maintained through the heating means disposed in the bed and head. The pressure is primarily exerted by the upward movement of the bed, the pressure head serving merely as an opposing or abutting surface having a fixed position determined by the adjustment of the block 84 which is engaged by arm 71.

In addition to pressing the collar, the machine performs the additional function of shaping the edges of the same at the point by applying pressure against the edges through the medium of the edges 21, 22 of the internal die and the walls 49, 50 of the external die. Moreover, in applying the collar to the die, as illustrated in Fig. 6, the operator may readily distribute the surplus material in the point of the collar. This distribution of the excess material produced when the collar is turned inside out, is also obtained by the pressure against the edges of the collar between the dies and by the frictional engagement of the collar with the bed surface as the bed rises.

As explained in my copending application, above identified, it will frequently be found desirable to insert in the collar points before they are applied to the die a cementitious waterproof material in either powder, or liquid or paste-like form. Gum arabic, a casein solution and a formaldehyde bath, or a cellulose ester in a volatile solvent will be found satisfactory.

Figures 4 and 8 show the collar top for the manufacture of which the machine is primarily designed. This collar comprises outer facing plies A, B, and an interliner C (Fig. 8) all having inturned edges secured together by a line of stitching S. This stitching is applied preliminary to the turning of the collar. In other words, the several plies are superimposed with their edges in registry and stitched along one longitudinal edge L and the transverse edges T (Fig. 4). The lines of stitching meet and form the points P. Thereafter, the collar is turned inside out which results in the inturning of the edges, as shown in Fig. 8 and the concealing of the stitching. The turning operation is performed by hand, and causes the irregular bulking of the points, as illustrated at the lower end of the collar shown in Figure 4. This irregular or non-uniform bulking is due to the improper distribution of the surplus material formed at the point. The collar is then positioned upon the die 18 in the manner illustrated in Figure 6, and in applying the collar to the die the operator will work the die well into the point in such a way as to distribute the surplus material. The die is preferably inserted between the ply B and the interliner C, as shown in Figure 8.

Before the collar is subjected to heat and pressure or to the shaping operation, it has been found desirable to insert into the point at the opposite side of the interliner C from the die, i. e. at the side containing the inturned edges, a waterproof cementitious material of the character mentioned; this will impregnate the collar at the point and upon hardening will stiffen or impart a set to the point. This material should be of a character which will not lose its stiffening characteristics under such heat and pressure as is applied during the usual laundering operation and should be adapted to retain during repeated laundering of the collar the set shape imparted by the machine in the operations before described. No claim is made in the present application to the method, the same being covered in my patent above identified.

At the upper portion of Figure 4, the point of the collar is shown after it has been subjected to the pressing and shaping operations described; thereafter the usual exposed line of stitching may be run along the edges of the collar.

Although the machine has been described in connection with the shaping of a point of a collar for which it is primarily designed, it will be understood, of course, that the same is adapted for use in the shaping of points of any garment or article of apparel, and the term "collar", as used throughout the specification and claims, is to be so interpreted.

Obviously, numerous modifications may be made in the machine described without departing from the invention, the essential features of which are set forth in the following claims.

I claim:

1. A collar point shaping machine for use in collar manufacture comprising a substantially flat die having a narrow end adapted to be inserted between the plies and into a point of a collar having its plies stitched together to form the collar points, a bed, means for positioning the die upon the bed with a collar fitted thereon, a head for applying pressure to the die and collar while the latter are on said bed, spaced walls above said bed forming a recess adapted to receive said die, said walls being arranged to confine and abut closely the edges of a collar positioned therebetween by said die, said walls extending transversely to the plane of the bed, and means for applying heat to the collar while under pressure.

2. A collar point shaping machine for use in collar manufacture comprising a substantially flat die having a narrow end adapted to be inserted between the plies and into a point of a collar having its plies stitched together to form the points, a bed, means for positioning the die upon the bed with a collar fitted thereon, a head for applying pressure to the die and collar while the latter are on said bed, walls forming a recess for receiving said die, said walls closely following in substantially abutting relation the edges of said die when the latter is positioned therebetween and being arranged over said bed and extending transversely to the plane of the bed, for shaping the collar point as the pressure is applied, and means for applying heat to the top and bottom surfaces of the collar while under pressure.

3. A collar point shaping machine for use in the manufacture of multiple ply collar tops comprising a substantially flat die having an end adapted to be inserted between the plies and into a point of a collar top having its plies stitched together to form the collar points, an external die having walls closely following the edges of the first mentioned die in substantially abutting relation whereby to confine said first mentioned die and a collar positioned thereon, said external die having a bottom forming a supporting surface to the plane of which the walls extend transversely, and means for applying pressure to the collar point within said external die.

4. A collar point shaping machine for use in the manufacture of multiple ply collar tops comprising a substantially flat die having an end adapted to be inserted between the plies and into a point of a collar top having its plies stitched together to form the collar points, an external die forming a pointed recess for the first mentioned die and having walls closely following the edges of the first mentioned die in substantially abutting relation therewith whereby to confine the edges of a collar point between the external and internal dies, said walls extending transversely to the plane of the first mentioned die, and means for distributing the fabric over the die and imparting a set to the collar point, said last-mentioned means being adapted to apply heat and pressure to the collar point while the same is within said recess.

5. A collar point shaping machine for use in the manufacture of multiple ply collar tops comprising a die having an end adapted to be inserted between the plies and into a point of a collar top having its plies stitched together to form the collar points, a bed having a die provided with walls forming a recess adapted to receive the first-mentioned die therein after a collar has been positioned thereon, the walls of said second die closely following and confining the edges of the first mentioned die in substantially abutting relation therewith, whereby to confine the edges of a collar point positioned on said first mentioned die, said walls extending transversely to the plane of the first mentioned die, means for disposing the first-mentioned die on said bed and between the walls of the bed die, means for pressing the collar against the bed while the first die is positioned on the bed, and means for applying heat while the collar and die are under pressure.

6. A collar point shaping machine for use in the manufacture of multiple ply collar tops comprising a die having an end adapted to be inserted between the plies and into a point of a collar top having its plies stitched together to form the collar points, a bed having thereabove a die provided with walls forming a point receiving recess adapted to receive the first-mentioned die therein after a collar has been positioned thereon, the walls of said second die being arranged to closely follow and substantially abut the edges of the first mentioned die, whereby to confine the edges of a collar positioned on said first mentioned die, said walls extending transversely to the plane of the first mentioned die, means for causing movment of the first-mentioned die and the bed die one toward another in planes parallelling the bed and collar surfaces whereby to distribute the material of the collar point and shape the latter, and means for applying heat and pressure to the shaped point within said second die.

7. A collar point shaping machine for use in the manufacture of multiple ply collar tops comprising a die having an end adapted to be inserted between the plies and into a point of a collar top having its plies stitched together to form the collar points, a bed having associated therewith a die provided with walls forming a point receiving recess adapted to receive the first-mentioned die therein after a collar has been positioned thereon, the walls of said second die closely following in substantially abutting relation the edges of the first mentioned die, and extending transversely to the plane of the first mentioned die, means for causing movement of the first-mentioned die and the bed die one toward another in planes paralleling the bed and collar surfaces whereby to distribute the material of the collar point and shape the latter, and means for applying heat and pressure to the point while the die remains therein.

8. A collar point shaping machine for use in the manufacture of multiple ply collar tops comprising a die having an end adapted to be inserted between the plies and into a point of a collar top having its plies stitched together to form the collar points, a bed, said bed having a recess adapted to receive said die with the collar fitted thereon, said recess having walls which extend transversely to the plane of the first mentioned die and follow and confine the edges of a collar positioned on said die, the die edges and recess walls being relatively movable toward one another into substantially abutting relation whereby to shape the point of a collar positioned on said die, means for moving the die into said recess and then to cause the die edges and recess walls to be advanced toward one another, and means for applying heat and pressure to a collar point while on the die.

9. A collar point shaping machine for use in the manufacture of multiple ply collar tops comprising a die having an end adapted to be inserted between the plies and into a point of a collar top having its plies stitched together to form the collar points, a bed, said bed having a recess adapted to receive said die with the collar fitted thereon, said recess having walls which extend transversely to the plane of the bed and follow and confine the edges of a collar on said die, the die edges and recess walls being relatively movable toward one another whereby to shape the point of a collar positioned on said die, means for moving the die into said recess and then to cause the die edges and recess walls to be advanced toward one another, and means for applying heat and pressure to a collar point while positioned in said recess.

10. A collar point shaping machine for use in the manufacture of multiple ply collar tops comprising a die having an end adapted to be inserted between the plies and into a point of a collar top having its plies stitched together to form the collar points, a bed arranged beneath said die, said bed having a recess adapted to receive said die with a collar fitted thereon, the walls of the recess extending transversely to the plane of the bed and closely following the edges of said die in substantially abutting relation therewith, means for lowering the die into said recess and for relatively advancing the same and the recess walls over the bed surface whereby to shape a collar point positioned thereon, and means for heating and pressing a collar on said die while the latter is disposed in said recess.

11. A collar point shaping machine for use in the manufacture of multiple ply collar tops comprising a die having an end adapted to be inserted between the plies and into a point of a collar top having its plies stitched together to form the collar points, a bed arranged beneath said die, said bed having a recess adapted to receive said die with a collar fitted thereon, the walls of the recess closely following the edges of said die, means for moving the die into said recess and for causing relative advancement between the same and the recess walls over the bed surface whereby to shape a collar point positioned thereon, and means for heating and pressing a collar shaped by said die while the collar is disposed in said recess, said last-mentioned means comprising a pressure head above said die, means for causing relative movement between the head and the bed and means for heating the collar between the head and bed.

12. A collar point shaping machine for use in collar manufacture comprising a substantially flat die having a narrow end adapted to be inserted between the plies and into a point of a collar having its plies stitched together to form the collar points, an external die having walls adapted to substantially abut the edges of a collar shaped by the first mentioned die and to closely receive said first-mentioned die, said walls extending transversely to the plane of said flat die, and means for pressing the collar shaped by the first mentioned die and positioned in the second die, said means comprising a bed and a pressing means above said bed, the pressing means being adapted to enter said second die, and means for adapting said pressing means and said second die to collar points of various shapes.

13. A collar point shaping machine for use in the manufacture of multi-ply collar tops comprising a die adapted to be inserted between the plies and into a point of a collar top, and external die adapted to receive said first-mentioned die and having walls following closely in substantially abutting relation the edges of the first mentioned die, said walls extending transversely to the plane of said first mentioned die, means permitting the adaption of said external die to collars of various shapes, means for pressing a collar positioned on the first-mentioned die and in the second die, said means including a pressing means adapted to enter said second die, and means for detachably mounting said pressing means whereby a means conforming to the adjustment of the external die may be readily applied to the machine.

14. A collar point shaping machine comprising a bed, walls on said bed extending transversely to the plane of the bed and forming a recess adapted to conform substantially to the shape of a collar point and abut the edges thereof, means for permitting the movement of at least one of said walls whereby to permit the provision of a recess for various shapes, a die adapted to be inserted into the point and between the plies of a collar and to be positioned in said recess, and means for pressing the collar point while positioned in said recess, said pressing means including a pressing means adapted to enter the recess and detachably positioned upon the machine, whereby to permit use of pressing means conforming to the various forms of the recess.

15. A collar point shaping machine comprising a die adapted to be inserted between the plies and into a point of a collar, walls extending transversely to the plane of said insertable die and forming a recess adapted to receive the die with the collar positioned thereon, said walls being arranged to closely follow in substantial abutting relation the edges of said die, means for adapting the recess to dies and collars of varying shapes, and means for applying pressure to the collar while on said die and in said recess.

16. In a garment point forming machine, a bed, walls extending transversely to the plane of the bed and forming a recess adapted to confine and substantially abut the edges of a garment point positioned therein and confine the same to a predetermined shape, means for internally supporting a garment point, means for effecting relative movement between said last mentioned means and said bed whereby to position the garment point on said bed and means for applying heat and pressure to a garment point positioned in said recess.

17. In a garment point forming machine, a bed, walls extending transversely to the plane of the bed and forming a recess adapted to confine and substantially abut the edges of a garment point positioned therein and confine the same to a predetermined shape, the walls of said recess being adjustable to conform to points of varying shapes and means for applying heat and pressure to a garment point positioned in said recess.

18. In a garment point forming machine, a bed, walls extending transversely to the plane of the bed and forming a recess adapted to confine and substantially abut the edges of a garment point positioned therein and confine the same to a predetermined shape, and means for applying heat and pressure against the surfaces while rigidly confining internally and externally the edges of a garment point positioned in said recess.

19. In a garment point forming machine, a bed, walls extending transversely to the plane of the bed and forming a recess adapted to confine and substantially abut the edges of a garment point positioned therein and confine the same to a predetermined shape, an internal shaping die adapted to fit between the plies of a garment and to position the same within said recess, means for effecting relative movement between said bed and said internal die to position the internally shaped point on said bed and means for applying heat and pressure to a garment point positioned in said recess.

20. In a garment point forming machine, a bed, walls extending transversely to the plane of the bed and forming a recess adapted to confine and substantially abut the edges of a garment point positioned therein and confine the same to a predetermined shape, means for positioning a garment point within said recess, and means for applying heat and pressure to a garment point positioned in said recess.

21. In a garment point forming machine, a bed, walls extending transversely to the plane of the bed and forming a recess adapted to confine and substantially abut the edges of a garment point positioned therein and confine the same to a predetermined shape, an internal shaping die adapted to fit between the stitched-together plies of a garment and to position the same within said recess, means for causing a relative movement between said die and recess to position the die in said recess, and means for applying heat and pressure to a garment point positioned in said recess.

22. In a garment point forming machine, walls spaced apart and forming therebetween a recess adapted to closely follow in substantially abutting relation the edges of a garment point positioned therein and confine the same to a predetermined shape, said recess having a bottom surface disposed in a plane from which said walls extend at an angle whereby the walls may abut the edges of and confine a garment point positioned on said bottom surface, means for applying heat and pressure to a garment point within said recess, said last mentioned means comprising a member movable toward and from said bottom surface, and means movable toward and from said bottom surface for supporting a garment point and positioning the same between said bottom surface and the pressure applying means.

23. In a garment point forming machine, walls spaced apart and forming therebetween a recess adapted to closely follow in substantially abutting relation the edges of a garment point positioned therein and confine the same to a predetermined shape, said recess having a bottom surface disposed in a plane from which said walls extend at an angle whereby the walls may abut the edges of and confine a garment point positioned on said bottom surface, means for supporting and positioning a garment point in said recess, means for effecting relative movement between said last mentioned means and said walls whereby to position a supported garment point in said recess, and means for applying heat and pressure to a garment point within said recess.

24. In a garment point forming machine, walls spaced apart and forming therebetween a recess adapted to closely follow in substantially abutting relation the edges of a garment point positioned therein and confine the same to a predetermined shape, said recess having a bottom surface disposed in a plane from which said walls extend at an angle whereby the walls may abut the edges of and confine a garment point positioned on said bottom surface, means for positioning a garment point in said recess, said means comprising a die adapted to fit between the plies of a garment point, and means for applying heat and pressure to a garment point within said recess.

25. In a garment point forming machine, walls spaced apart and forming therebetween a recess adapted to closely follow in substantially abutting relation the edges of a garment point positioned therein and confine the same to a predetermined shape, said recess having a bottom surface disposed in a plane from which said walls extend at an angle whereby the walls may abut the edges of and confine a garment point positioned on said bottom surface, means for positioning a garment point in said recess, said means comprising a die adapted to fit between the plies of a garment point and having edges closely following the edges of a garment point, whereby to confine the garment point edges between the edges of the die and the recess walls, and means for applying heat and pressure to a garment point within said recess.

26. In a garment point forming machine, walls spaced apart and forming therebetween a recess adapted to closely follow in substantially abutting relation the edges of a garment point positioned therein and confine the same to a predetermined shape, said recess having a bottom surface disposed in a plane from which said walls extend at an angle whereby the walls may abut the edges of and confine a garment point positioned on said bottom surface, means for positioning a garment point in said recess, said means comprising a die adapted to fit between the plies of a garment point while positioned upon said die, and means for applying heat and pressure to a garment point within said recess.

27. In a garment point forming machine, a pair of walls adapted to closely follow in substantially abutting relation the edges of a garment point, said walls forming a recess to receive the point and confine the same to a predetermined shape, means for supporting a collar point, and means for causing relative movement between the support and said walls whereby to position the point within said recess and confine the edges of same, the walls extending transversely to the plane of said support, and means for applying heat and pressure to a garment point within said recess while the point is confined.

28. Apparatus for simultaneously shaping a plurality of folded and stitched portions of textile material comprising opposed members movable relatively toward and from each other for receiving and pressing the folded portions therebetween, one of the members comprising a die having side walls disposed in substantially vertical and intersecting planes, the other member being receivable within said side walls for pressing material into the die member, means for effecting relative movement to separate the members and to move the members relatively toward each other, means for supporting a garment point, and means for effecting relative movement between said supporting means and said members whereby to position a supported point between said members.

29. Apparatus for simultaneously shaping a plurality of folded and stitched portions of textile material comprising opposed members movable relatively toward and from each other for receiving and pressing the folded portions therebetween, one of the members comprising a die having substantially vertical side walls disposed at an acute angle to each other, the other member registering with the die and being complementary to and receivable within the side walls of the die, means for effecting relative movement to separate the members, other means for moving the members relatively toward each other, means for supporting a garment point, said means being insertable between the plies thereof, and means for effecting relative movement between said last mentioned means and said members whereby to position a supported point between said members.

30. A collar point shaping machine for use in collar manufacture comprising a substantially flat die having a narrow end adapted to be inserted between the plies and into a point of a collar having its plies stitched together to form the collar point, a bed, means for positioning the die upon the bed with a collar fitted thereon, a head for applying pressure to the die and collar while the latter are on said bed, spaced walls above said bed forming a recess adapted to receive said die, said walls being arranged to confine and abut closely the edges of a collar positioned therebetween by said die, said walls extending transversely to the plane of the bed, means on said head adapted to fit into said recess to engage and apply pressure to the surface of a garment point positioned in said recess by said flat die, means for effecting relative movement of said head and bed toward and from one another, and means for applying heat to the collar while under pressure.

31. A collar point shaping machine for use in the manufacture of multiple ply collar tops comprising a substantially flat die having an end adapted to be inserted between the plies and into a point of a collar top having its plies stitched together to form the collar points, an external die having walls closely following the edges of the first mentioned die in substantially abutting relation whereby to confine said first mentioned die and a collar positioned thereon, said external die having a bottom forming a supporting surface to the plane of which the walls extend transversely, and means for applying heat and pressure to the collar point within said external die, said last mentioned means comprising a head positioned above said external die, means on said head to fit between said walls for cooperating with said external die bottom for exerting pressure on the top and bottom surfaces of a collar positioned by said flat die between said head and said bottom surface, and means for effecting relative movement between said head and said bottom surface.

32. A collar point shaping machine for use in the manufacture of multiple ply collar tops comprising a substantially flat die having an end adapted to be inserted between the plies and into a point of a collar top having its plies stitched together to form the collar points, an external die having walls closely following the edges of the first mentioned die in substantially abutting relation whereby to confine said first mentioned die and a collar positioned thereon, said external die having a bottom forming a supporting surface to the plane of which the walls extend transversely, and means for applying heat and pressure to the collar point within said external die, said last mentioned means comprising a head positioned above said external die, means on said head to fit within said external die to cooperate with said external die bottom for exerting pressure on the surfaces of a collar positioned between said head and said bottom surface, and means for effecting relative movement between said head and said bottom surface while said flat die is positioned over said bottom surface and beneath the head.

33. A collar point shaping machine for use in the manufacture of multiple ply collar tops comprising a substantially flat die having an end adapted to be inserted between the plies and into a point of a collar top having its plies stitched together to form the collar points, an external die having walls closely following the edges of the first mentioned die in substantially abutting relation whereby to confine said first mentioned die and a collar positioned thereon, said external die having a bottom forming a supporting surface to the plane of which the walls extend transversely, means for moving said flat die toward and from said external die whereby to position a collar point within said external die, and means for applying heat and pressure to the collar point within said external die, said last mentioned means comprising a head positioned above said external die, means on said head for cooperating with said external die bottom for exerting pressure on the top and bottom surfaces of a collar positioned between said head and said bottom surface, and means for effecting relative movement between said head and said bottom surface while said flat die is positioned over said bottom surface and beneath the head.

34. A collar point shaping machine for use in the manufacture of multiple ply collar tops comprising a die having an end adapted to be inserted between the plies and into a point of a collar top having its plies stitched together to form the collar points, a bed having a die provided with walls forming a recess adapted to receive the first mentioned die therein after a collar has been positioned thereon, the walls of said second die closely following and confining the edges of the first mentioned die in substantially abutting relation therewith, whereby to confine the edges of a collar point positioned on said first mentioned die, said walls extending transversely to the plane of the first mentioned die, means for disposing the first mentioned die on said bed and between the walls of the bed die, means for heating and pressing the collar against the bed while the first die is positioned on the bed, said pressing means including a head having a pressure element thereon adapted to fit within said recess for exerting pressure against the top surface of a collar positioned on said die, and means for effecting relative movement between said head and said bed while a collar point is positioned on said bed by said die.

35. A garment point shaping machine for use in shaping the points formed by stitched together plies comprising a substantially flat die having an end adapted to be inserted between the plies and into the garment point, an external die having a bottom surface and walls adapted to substantially abut the edges of a garment shaped by said first mentioned die and to closely receive said first mentioned die, said walls extending transversely to the planes of said bottom surface and of said flat die, means for effecting relative movement between said flat die and said bottom surface whereby to position a garment point supported by said flat die between said walls, and means for heating and pressing a garment point shaped by said flat die and positioned between said walls, said pressing means comprising a head having a pressure element adpted to fit between said walls over said bottom surface and to apply pressure against the top surface of a garment point positioned between said walls, and means for effecting relative movement between said head and said external die while a garment point is positioned therebetween.

36. A garment point shaping machine for use in shaping the points formed by stitched together plies comprising a substantially flat die having an end adapted to be inserted between the plies and into the garment point, an external die having a bottom surface and walls adapted to substantially abut the edges of a garment shaped by said first mentioned die and to closely receive said first mentioned die, said walls extending transversely to the planes of said bottom surface and of said flat die, means for effecting relative movement between said flat die and said external die whereby to position a garment point supported by said flat die between said walls, and means for heating and pressing a garment point shaped by said flat die and positioned between said walls, said pressing means comprising a head having a pressure element adapted to fit between said walls over said bottom surface and to apply pressure against the top surface of a garment point positioned between said walls, and means for effecting relative movement between said head and said external die while a garment point is positioned therebetween and is retained in position between said walls by said flat die.

37. In a garment point forming machine, a bed, walls extending transversely to the plane of the bed and forming a recess adapted to confine and substantially abut the edges of a garment point positioned therein and confine the same to a predetermined shape, means for supporting a garment point, means for effecting relative movement between said last mentioned means and said bed whereby to position a supported garment point between said walls, means above said bed for applying pressure to the top surface of a garment point positioned on said bed between said walls, said last mentioned means comprising a pressure element cooperating with said bed, means for effecting relative movement of said bed and said pressure element toward and from one another, and means for applying heat to a garment point positioned in said recess.

38. In a garment point forming machine, a bed, walls extending transversely to the plane of the bed and forming a recess adapted to confine and substantially abut the edges of a garment point positioned therein and confine the same to a predetermined shape, the walls of said recess being removably supported to permit providing a recess for points of varying shapes, means for supporting a garment point, means for effecting relative movement between said supporting means and said bed whereby to position a supported garment point between said walls, means above said bed for applying pressure to the top surface of a garment point positioned on said bed between said walls, said last mentioned means comprising a pressure element cooperating with said bed, means for effecting relative movement of said bed and said pressure element toward and from one another, and means for applying heat to a garment point positioned in said recess.

39. In a garment point forming machine, a bed, walls extending transversely to the plane of the bed and forming a recess adapted to confine and substantially abut the edges of a garment point positioned therein and confine the same to a predetermined shape, the walls of said recess being removably supported to permit providing a recess for points of varying shapes, means for supporting a garment point, means for effecting relative movement between said last mentioned means and said bed whereby to position a supported garment point between said walls, means above said bed for applying pressure to the top surface of a garment point positioned on said bed between said walls, said last mentioned means comprising a pressure element cooperating with said bed, means for effecting relative movement of said bed and said pressure element toward and from one another, and means for applying heat to a garment point positioned in said recess, said pressure element being removable whereby to permit providing a pressure element corresponding in shape to the recess.

In testimony whereof I have hereunto set my hand.

WALTER J. BEATTIE.